Patented Feb. 24, 1942

2,273,940

UNITED STATES PATENT OFFICE 2,273,940

ADDITION PRODUCTS OF AMIDES OF LOW MOLECULAR CARBOXYLIC ACIDS AND PROCESS OF PRODUCING THE SAME

Hermann Dimroth, Heidelberg, Gerhard Graefinger, Ludwigshafen-on-the-Rhine, and Hans Haussmann, Mannheim, Germany, assignors, by mesne assignments, to General Aniline & Film Corporation, New York, N. Y., a corporation of Delaware No Drawing. Application October 20, 1938, Serial No 236,010. In Germany November 1, 1937

15 Claims. (Cl. 260—555)

The present invention relates to addition products of amides of low molecular carboxylic acids and a process for producing them.

We have found that commercially valuable addition products can be obtained from acid amides by acting with chlorsulphonic acid on amides of low molecular carboxylic acids. In this way liquid or crystalline addition products are obtained which are stable even at high temperatures. The amides may be substituted in the amido groups.

For example amides of the low molecular fatty acids, as for example those of acetic acid, propionic acid or butyric acid, and ammonia, methylamine, ethylamine, dimethylamine, ethylene diamine, piperidine, benzylamine, aniline or other amines of low molecular weight, and also formamide and urea are suitable. Derivatives of formamide and urea which are derived from secondary amines may frequently be used with special advantage. Also mixtures of the said amides may be employed.

The reaction of chlorsulphonic acid with the said amides may be effected by simple mixing at ordinary temperature, care being taken by cooling that the heat formed is withdrawn and the temperature does not rise too high. When solid reaction products are formed, it is advantageous, after complete mixing of the initial materials, to heat the mixture somewhat above the melting point, as for example to 50° to 60° C., in order to complete the reaction. It is also possible to work in the presence of solvents which cannot be sulphonated or which can only be sulphonated with difficulty, as for example carbon tetrachloride, tetrachlorethane or nitrobenzene.

In the said manner there are obtained industrially valuable products which are suitable for example for the introduction of sulphuric acid ester groups into organic compounds containing hydroxyl groups, in particular those which contain olefinic double linkages.

The following examples will further illustrate how the said invention may be carried out in practice but the invention is not restricted to these examples. The parts are by weight.

Example 1

60 parts of acetamide are introduced into 114 parts of chlorsulphonic acid while cooling to from 0° to 10° C. and while stirring well, the temperature being allowed to rise slowly to from 50° to 60° C. towards the end of the introduction in order to prevent solidification of the addition compound formed before the reaction is completed. After cooling a solid crystallized product is obtained which can readily be pulverized and which is strongly hygroscopic.

Example 2

About 60 parts of urea are introduced into 230 parts of chlorsulphonic acid while cooling to from 0° to 10° C. and while stirring well, the mixture being stirred at the same temperature until complete dissolution has taken place. A liquid product is obtained which is stable even at high temperatures.

By using twice the amount of urea, a solid product is obtained which melts at from 50° to 60° C. and which is also stable.

Example 3

154 parts of acetodimethylamide are dissolved in 100 parts of carbon tetrachloride and, while cooling to from 0° to 10° C. and stirring well, 123 parts of chlorsulphonic acid are allowed to flow slowly into the said solution. A pale yellowish colored mass of viscous nature is obtained which deposits crystals after standing for some time.

Example 4

22 parts of formamide are slowly introduced into 65 parts of chlorsulphonic acid while cooling to from 0° to 10° C. and while stirring well. After cooling, a solid product is obtained which melts at from 50° to 60° C. and which solidifies unchanged upon cooling again.

Example 5

20 parts of urea, 20 parts of acetamide and 15 parts of formamide are introduced in 117 parts of chlorsulphonic acid between zero and 10° C. while stirring well. The mixture is then heated up to between 50 and 60° C. until a solution is obtained. Thus a liquid product is obtained which does not solidify even at zero °C. and which is particularly suitable as sulphonating agent while employing low temperatures.

Example 6

117 parts of chlorsulphonic acid are introduced into a mixture of 30 parts of urea and 23 parts of formamide while stirring at a temperature from zero to 10° C. A yellow mass liquid at normal temperature is obtained which is suitable as sulphonating agent particularly for sulphonating high molecular aliphatic compounds containing hydroxyl groups besides olefinic double bonds.

What we claim is:

1. The process of producing addition products which comprises reacting an amide derived from a substance selected from the class consisting of ammonia and saturated lower aliphatic- and heterocyclic amines and a saturated aliphatic carboxylic acid containing at most 4 carbon atoms, the said amide being free from hydroxyl groups and double bonds between two carbon atoms with chlorsulfonic acid at a temperature of about 10° C.

2. The process of producing addition products which comprises reacting an amide derived from a substance selected from the class consisting of ammonia and saturated lower aliphatic- and heterocyclic amines and a saturated aliphatic carboxylic acid containing at most 4 carbon atoms, the said amide being free from hydroxyl groups and double bonds between two carbon atoms with chlorsulfonic acid at a temperature of about 10° C., in the presence of a solvent which does not react with chlorsulfonic acid.

3. The process of producing addition products which comprises reacting a mixture of amides derived from a substance selected from the class consisting of ammonia and saturated lower aliphatic- and heterocyclic amines and saturated aliphatic carboxylic acids containing at most 4 carbon atoms, the said amides being free from hydroxyl groups and double bonds between two carbon atoms with chlorsulfonic acid at a temperature of about 10° C.

4. The process of producing addition products which comprises reacting chlorsulfonic acid with urea at a temperature of about 10° C.

5. The process of producing addition products which comprises reacting chlorsulfonic acid with a mixture of formamide and urea at a temperature of about 10° C.

6. The process as defined in claim 1 wherein the temperature is increased gradually to at most 50–60° C.

7. The process as defined in claim 2 wherein the temperature is increased gradually to at most 50–60° C.

8. The process as defined in claim 3 wherein the temperature is increased gradually to at most 50–60° C.

9. The process as defined in claim 4 wherein the temperature is increased gradually to at most 50–60° C.

10. The process as defined in claim 5 wherein the temperature is increased gradually to at most 50–60° C.

11. The process of producing addition products which comprises acting with chlorsulfonic acid on an amide derived from a substance selected from the class consisting of ammonia and low molecular saturated lower aliphatic- and heterocyclic amines, and a saturated aliphatic carboxylic acid containing at most 4 carbon atoms, the said amide being free from hydroxyl groups and double bonds between two carbon atoms at a temperature not exceeding 60° C.

12. The addition product of chlorsulfonic acid and an amide derived from a substance selected from the class consisting of ammonia and low molecular saturated lower aliphatic- and heterocyclic amines, and a saturated aliphatic carboxylic acid containing at most 4 carbon atoms, the said amide being free from hydroxyl groups and double bonds between two carbon atoms.

13. The addition product of urea and chlorsulphonic acid.

14. The addition product of chlorsulfonic acid and a mixture of amides derived from low molecular saturated lower aliphatic- and heterocyclic amines, and saturated aliphatic carboxylic acids containing at most 4 carbon atoms the said amides being free from hydroxyl groups and double bonds between two carbon atoms.

15. The addition product of chlorsulphonic acid and a mixture of formamide and urea.

HERMANN DIMROTH.
GERHARD GRAEFINGER.
HANS HAUSSMANN.